A. RICKART.
Harvesters.
No. 135,729.  Patented Feb. 11, 1873.
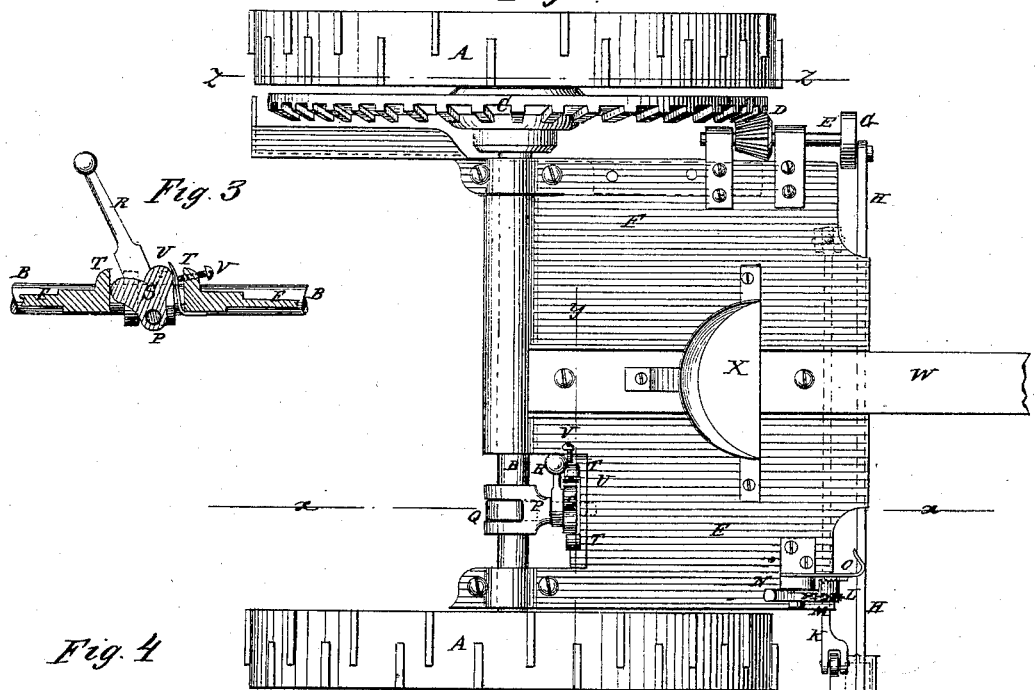
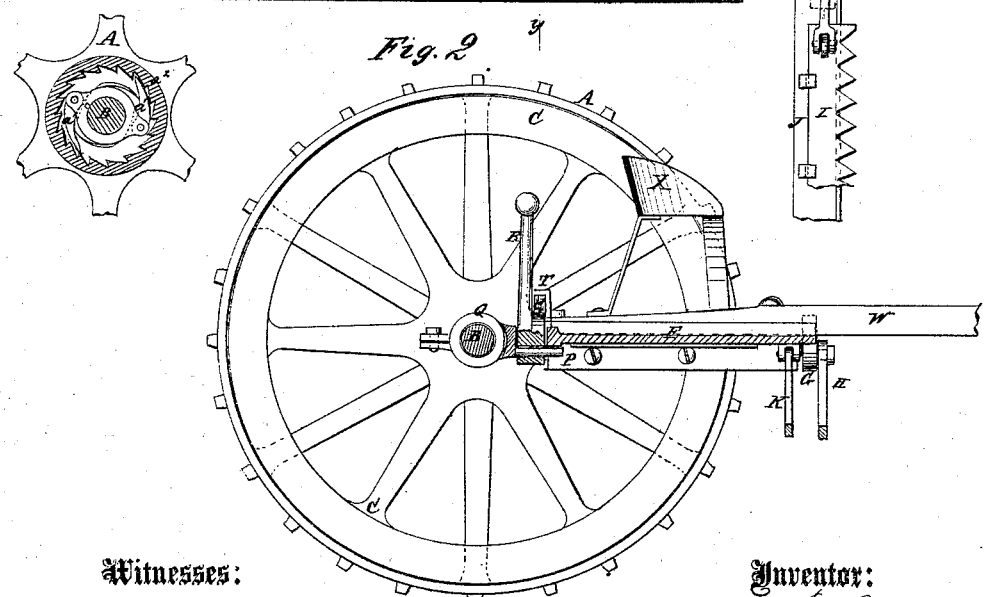
Witnesses:
A. W. Almqvist
C. Sedgwick
Inventor:
A. Rickart
per
Mmm
Attorneys.

UNITED STATES PATENT OFFICE.

ALEXANDER RICKART, OF SCHOHARIE, NEW YORK.

IMPROVEMENT IN HARVESTERS.

Specification forming part of Letters Patent No. 135,729, dated February 11, 1873.

*To all whom it may concern:*

Be it known that I, ALEXANDER RICKART, of the city and county of Schoharie and State of New York, have invented a new and useful Improvement in Mowers and Reapers; and I do hereby declare that the following is a full, clear, and exact description of the same, reference being had to the accompanying drawing forming a part of this specification, in which—

Figure 1 is a top view of my improved machine. Fig. 2 is a detail sectional view of the same taken through the line $x\,x$, Fig. 1. Fig. 3 is a detail section taken through the line $y\,y$, Fig. 1. Fig. 4 is a detail section taken through the line $z\,z$, Fig. 1.

The invention consists in an improvement upon the usual means for throwing in and out of gear the mechanism which drives the cutter-bar, as hereinafter fully described and pointed out in the claim.

A represents drive-wheels, connected with the journals of the axle B by pawls $a^1$ and ratchet-wheels $a^2$. To the axle B, at the inner side of one of the drive-wheels A, is secured a large gear-wheel, C, which meshes into the teeth of small gear-wheel D, attached to the shaft E, which revolves in bearings attached to the forward part of the side edge of the frame or platform F. To the forward end of the shaft E is attached a small crank or crank-wheel, G, to the crank-pin of which is pivoted the end of the pitman H, the other end of which is pivoted to the sickle-bar I that slides upon the finger-bar J, in the ordinary manner. The finger-bar J is hinged to the bar K, the other end of which is hinged to the platform or frame F. To the bar K or to the finger-bar J is attached the lower end of a chain, L, the upper end of which is attached to a segment of a pulley, M, which has a lever, N, formed upon or attached to it, and which is pivoted to supports attached to the frame or platform F. To the rear part of the platform or frame F are attached bearings which receive the axle B, and which are so formed as to slide longitudinally upon the said axle B, so that the gear-wheel D may be thrown into and out of gear with the gear-wheel C by sliding the said frame or platform upon the said axle. P is a pin, having a hole through its base for the passage of the axle B, and which is kept from sliding upon said axle by a collar, Q, secured to it. To the pin P is pivoted a lever, R, having a double cam, S, formed upon or attached to it. The double cam S works between shoulders or studs T formed upon or attached to the platform or frame F, so that the said platform may be moved in one or the other direction to throw the gear-wheel D into and out of gear with the gear-wheel C. The space between the shoulders or studs T is made a little wider than the double cam S, and in it, along one of said shoulders or studs T, is placed a bar or arm, U, the lower end of which is secured to the platform or frame F, and its upper end is left free. The bar or arm U is held forward against the double cam S by a set-screw, V, which screws through the shoulder or stud T, along which the bar or arm U is placed, so that by turning the said screw forward the wear may be taken up. W is the tongue, which is securely attached to the platform or frame F. X is the driver's seat, which is attached to the platform or frame F, or to the tongue W, as may be desired.

Having thus described the machine embodying my invention, what I claim as new, and desire to secure by Letters Patent, is—

The combination of pin P, collar Q, and doubled-cammed lever R S, with studs T T and arm U on frame F, as and for the purpose described.

ALEXANDER RICKART.

Witnesses:
    WM. D. GEBHARD,
    DANIEL KNOWER.